July 13, 1948.  L. O. FRENCH  2,445,138
GRINDER
Filed Nov. 13, 1946  2 Sheets-Sheet 1
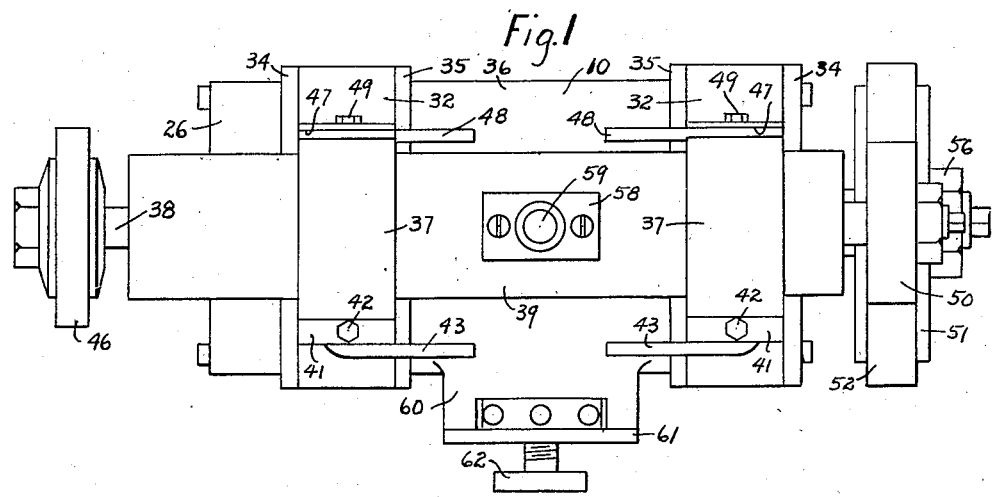
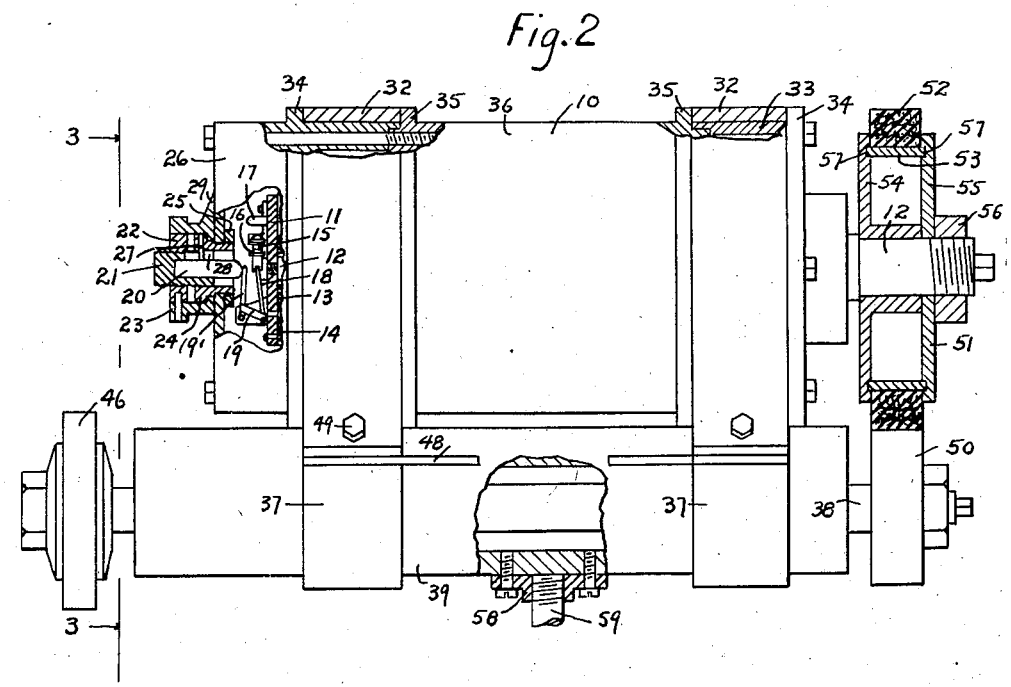
INVENTOR.
Louis O. French July 13, 1948.  L. O. FRENCH  2,445,138
GRINDER
Filed Nov. 13, 1946  2 Sheets-Sheet 2
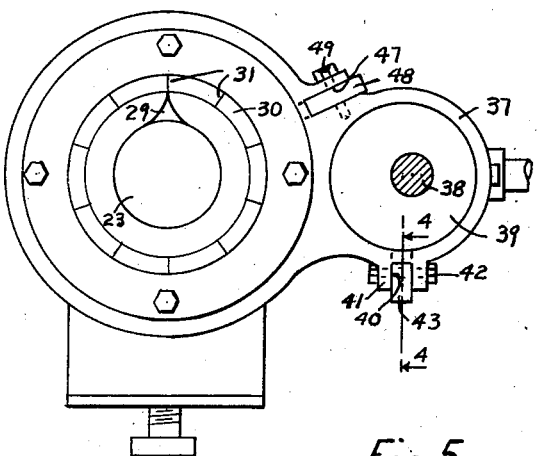
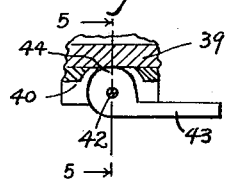
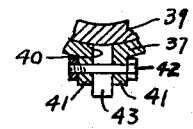
INVENTOR.
Louis O. French Patented July 13, 1948

2,445,138

UNITED STATES PATENT OFFICE 2,445,138

GRINDER

Louis O. French, Milwaukee, Wis.

Application November 13, 1946, Serial No. 710,791

6 Claims. (Cl. 51—259)

The invention relates to grinders and more particularly to so-called lathe or tool post grinders for use on lathes, milling machines, shapers, grinding machines, and other machine tools.

Grinders of the above type usually embody a constant speed electric motor and vary the speed of the wheel spindle by interchangeable belt-connected pulleys on the motor shaft and wheel spindle. Constant changing of belt pulleys for different kinds of work is a decided inconvenience, and the pulley hubs wear from frequent changing, so that they cannot be tightened up securely and have to be replaced. One of the objects of this invention is to provide a portable grinding tool in which the motor shaft and wheel spindle shaft have a constant drive ratio connection with each other to increase the speed of the wheel spindle over that of the motor and in which all the speed changes for the wheel spindle are varied by varying the motor speed through a wide range by the manual adjustment of a continuously variable speed governor for the motor. With such an arrangement no time is lost in adjusting the grinder as it is always ready for the internal grinding of small holes or the external grinding of large diameter work and at a speed best suited for each particular job.

Another object of the invention is to eliminate the usual belt by providing a constant ratio friction drive in which one of the wheels, preferably that on the motor shaft is provided with a somewhat compressible friction drive surface which is brought into efficient pressure driving engagement with a metal wheel on the wheel spindle shaft by the bodily movement or turning of the wheel spindle in a path eccentric to its supporting mounting and the locking of the spindle quill to the frame of the machine when the proper driving pressure connection is made.

A further object of the invention is to provide an improved arrangement for adjustably securing the wheel spindle supporting means in any desired circumferential adjustment relative to the motor shaft through a wide range. More particularly, the wheel spindle quill is mounted in bearing bosses formed on a pair of bands that surround parts of the motor housing and locking means preferably a quick acting lever lock or locks are used to clamp said bands to said housing in any desired angular position of the wheel spindle relative to the motor shaft, so that the grinding wheel may be quickly set at the desired height relative to the machine on which it is used to properly contact the work.

The invention further consists in the several features hereinafter set forth and more particularly defined by claims at the conclusion hereof.

In the drawings:

Fig. 1 is a side elevation view of a grinder embodying the invention;

Fig. 2 is a plan view of the grinder, parts being broken away and parts being shown in section;

Fig. 3 is a vertical sectional view taken on the line 3—3 of Fig. 2;

Fig. 4 is a detailed vertical sectional view taken on the line 4—4 of Fig. 3;

Fig. 5 is a detailed vertical sectional view taken on the line 5—5 of Fig. 4.

Referring to the drawings, the numeral 10 designates generally an electric motor. The motor is an alternating current motor, preferably of the universal or series type, whose speed is varied by a manually settable centrifugally operable speed governor control. Motors of the type just mentioned have the characteristic that the torque varies greatly with the speed, being greatest when the speed is slowest. Thus when a heavy load is thrown on a universal or series motor, the speed decreases, with the result of a great gain in torque, to take care of the increased load, and when such a motor is used in a grinder of the type herein described, the larger wheels which require greater torque at lower speeds may be efficiently operated if speed governing mechanism be used which will permit the motor to exercise its torque changing characteristics most efficiently. I believe the association of a motor of this type as hereinafter described is new and is of considerable advantage as it eliminates many parts and several operations necessary with the known practice in devices of this kind of using a constant speed motor and interchangeable pulleys and belt connections for varying the speed of the wheel spindle. The governor control for the motor may be of any suitable construction, and in this connection reference is made to U. S. Patent No. 1,767,146, of June 24, 1930, to Royal Lee. In the patent above referred to there is disclosed an electric motor whose shaft operates a centrifugally operable speed control governor whose speed range is settable by a manually operable member, the governor including a switch in the motor circuit, which when the speed of the motor reaches a value at which the governor is set, opens so that the set speed is not materially exceeded. A governor mechanism of this kind may be used to operate in ranges of 1000 to 10,000 R. P. M. or from 2500 to 15,000 R. P. M., for example, and through the manual setting of the governor the speed of the motor is continuously variable through the entire speed range, so that unlike the pulley and belt connections above referred to the speed changes within the range of the governor may be said to be infinitely variable since the motor speed may be increased or decreased by relatively small increments. For the purpose of the present disclosure the governor control mechanism has not been shown in detail, but parts of the control of said patent have been shown and include the breaker disk 11 of insulating material connected to the motor armature shaft 12 and carrying collector rings 13 and 14 which are operatively connected, as shown in said patent, to one of the motor field windings and the armature. A spring supported contact 15 is mounted on the disk 11 and connected to the ring 13, and a similar contact 16 is mounted on said disk and connected to the ring 14. The mounting of the contacts 15 and 16 are at a distance from the center of the disk 11, and as the motor or armature shaft 12 revolves, the contacts 15 and 16 move outwardly under the action of centrifugal force. The contact 15 may move outwardly to the extent defined by a stop pin 17. The contact 16 may also move outwardly, but the extent of its outward movement is determined by the operator through its connection by a link 18 with one arm of a bell crank lever 19 pivotally mounted on the disk 11, the other arm 19' of said lever being engaged by a manually settable pin 20 of insulating material. Thus depending upon the position of the pin 20 will depend the amount that the contact 16 moves outwardly and consequently the speed of the motor shaft 12 at which the contacts 15 and 16 separate, so that the load circuit of the motor is opened, so that the set speed is not materially exceeded. As herein shown, the manually settable means includes a screw 21 carrying the pin 20 and working in a manually rotatable nut 22 pinned to a manually settable knob 23 which is mounted on a sleeve support 24 secured by a nut 25 to the end cap 26 of the motor housing. A pin 27 on the support 24 forms a key working in a key slot 28 in the screw 21, so that as the knob 23 is turned, the screw 21 will be moved lengthwise relative to the bell crank lever 19, and thus move the pin 20 either inwardly or permit its outward movement under the action of forces acting on said pin through said lever 19. The knob 23 has a pointer or index member 29 cooperating with a dial 30 provided with speed index designations indicated by the lines 31 in Fig. 3, so that the knob 23 may be turned to bring the pointer 29 into line with any desired speed indication within the range of the governor. Thus the speed of the shaft 12 may be varied through a wide range of speed.

With a speed governor of the circuit closure type the full current of the motor is always and instantly available under the demand of the motor itself and associated with a universal or series motor the larger wheels can be operated efficiently at low speed because of the increase in torque at low speeds. The circuit closure type of governor thus has distinct advantages over a rheostat or variable resistance control because such a control, as a speed control, acts to cut down the current available to the motor at lower speeds and thus cannot efficiently drive the larger grinder wheels at the lower speeds required.

A grinder quill supporting frame is formed by a pair of metal bands 32 which have a close fit upon the cap portions 26 and 33 of the motor housing and turn about the shaft 12 as a center, each cap having an annular flange 34 cooperating with an annular flange 35 on the main body 36 of the housing to hold said bands against lengthwise movement relative to said housing. The bands 32 may be connected together by a bridge piece, if desired. Each band is provided with a bearing boss 37 in which the wheel spindle 38, mounted in the quill 39, is eccentrically mounted. As herein shown the spindle 38 has an eccentric mounting in the quill 39. The quill 39 may be of any standard or known construction in which the wheel spindle 38 is mounted either in preloaded ball bearing journals or in journals formed of tungsten carbide, and wick oilers are provided for lubricating the bearings. Since the constructional details of the grinder quill form no part of the present invention, further description is deemed unnecessary.

For clamping the quill 39 in the bearing bosses 37 to hold the spindle 38 in its desired eccentric position of adjustment, each band is provided with a slot 40 providing spaced ears 41 (see Figs. 3 to 5) receiving a pivot bolt 42 upon which a cam type locking lever 43 is mounted, the cam portion 44 of said lever working in said slot and engageable with the quill 39, and due to its eccentricity relative to the pivot 42 acting as a wedge between the boss and the quill to firmly bind the quill to said boss, the surface of said cam portion preferably being formed on a radius as shown in Fig. 5 substantially the same as that part of the quill which it engages, so that no sharp edges act to dig into or roughen the external surface of the quill.

For clamping the bands 32 in any desired position of circumferential adjustment relative to the motor housing, so that the grinder wheel 46 on the spindle 38 may be disposed in proper relation to the work, each band is provided with a slot 47 positioned at one side of the bearing boss 37 in which a cam type locking lever 48 similar to the lever 43 is pivotally mounted on a bolt 43 mounted in the walls of said boss, the slot 47 at its central portion extending through the band, similar to the slot 40, so that the face of the cam portion of said lever 48 may be brought into wedging engagement with the end caps of the housing on which said bands are mounted to firmly clamp the bands to said motor housing. Where the bands are connected together by the bridge piece, previously referred to, a single lever similar to the lever 48 mounted on said bridge piece may cooperate with the housing to lock the bands against turning movement.

A constant speed ratio driving connection between the motor shaft 12 and the wheel spindle 38 is provided, so that the wheel spindle is driven at a higher speed than the motor shaft, in most cases at least twice as fast as said shaft 12. Preferably for motors having a governed speed range between one thousand and ten thousand revolutions per minute, this ratio is one to four, and for motors whose speed range is between 2500 and 15,000 revolutions per minute the ratio of one to two and two-thirds is used. With such ratios the grinding wheel spindle may be rotated at speeds varying from sixty-six hundred revolutions per minute to forty thousand revolutions per minute which speed range will accommodate the use of large wheels of three to five inches in diameter for external grinding down to mounted wheels of one eighth inch in diameter. This fixed ratio driving connection may be a pulley on the motor shaft connected by a belt to a pulley on the wheel spindle, but in order to get away from the troubles sometimes encountered with a belt drive, I provide a direct friction wheel drive connection between the shafts 12 and 38.

The direct friction drive wheel connection includes a metal wheel 50 mounted on the wheel spindle 38 and a wheel 51 mounted on the motor shaft 12 and having a somewhat compressible driving rim portion 52 which may be mounted on a metal rim or ring 53 secured to the body of the wheel by clamping said rim 53 between a back plate 54 integral with the hub of said wheel 51 and a detachable front plate 55 secured in position by a nut 56 on the motor shaft 12, the plates 54 and 55 having annular grooves 57 receiving the edges of said rim 53 to center the same relative to the hub. This arrangement permits replacement of the wearing part of the wheel 51 when necessary. The rim portion 52 may be a tarred fiber composition, a vulcanized rubber and fabric composition, or a vulcanized rubber and shredded leather composition with fabric laminations or cords molded therein. The metal wheel 50 may be of cast iron or suitable aluminum or magnesium alloy. Friction drives require a pressure connection between the wheels involving a bodily movement of one of the shafts 12 or 38 toward each other. In the present instance the spindle 38 having an eccentric mounting in the bosses 37 of the bands 32 turning of the spindle quill 39 will act to change the radial position of the spindle 38 relative to the shaft 12, so that said spindle can be moved inwardly toward said shaft and thus bring the wheels 50 and 51 into pressure driving engagement with each other, and in order that this may be readily effected and the desired pressure is obtained, the quill 39 has a lever arm associated with it comprising a lever receiving socket member 58 secured to the quill and a lever 59 detachably threadedly mounted in said socket and by which the quill may be oscillated the desired amount to effect a good pressure engaging connection between the wheels 50 and 51. This pressure connection is maintained by securely clamping the quill 38 in its adjusted position by the locking levers 43. Thus the spindle 38 is brought and secured in efficient fixed ratio driving relation with the motor shaft 12, and this is preferably accomplished when the bands 32 are in their desired position of circumferential adjustment.

Thus the only operations in most instances that need to be performed by the operator in setting up the grinder for its work are the setting of the knob 23 to the desired speed position and the attachment of a grinding wheel 46 to the spindle 38 since the adjustment of the height of the spindle relative to the machine on which the grinder is used to bring it into axial alinement with the axis of the work is usually made but once or very infrequently and the wheels 50 and 51 once properly adjusted in driving engagement need no further attention.

For mounting the grinder on a machine tool, the motor may have a supporting base portion 60 formed integral with or operatively connected to it, said base portion having a base plate 61 secured thereto and carrying an adjustable clamping bolt member 62 for engaging in the ways of a tool post slide, a table or other support to clamp the base 60 thereto.

Where in grinders of this general type the wheel spindle is not circumferentially adjustable relative to the motor housing but is vertically adjustable relative to the supporting base, then the bearing bosses 37 shown herein may be formed in the present instance as an integral part of the housing caps 26 and 33.

I desire it to be understood that this invention is not to be limited to any particular form or arrangement of parts except in so far as such limitations are included in the claims.

What I claim as my invention is:

1. In a grinding machine of the type described, the combination of a support, an electric motor having a shaft and a grinder quill having a spindle carried by said support, a constant ratio direct friction pressure drive connection between a wheel on said motor shaft and a wheel on said spindle to drive said spindle at a speed greater than that of said motor shaft, means including a lever and an eccentric mounting connection for the spindle for moving the same relative to said motor shaft to establish a pressure drive connection between said wheels, pivoted cam lever locking means for securing said quill and spindle in adjusted position, a variable motor speed governor driven by said motor shaft, and manually settable means for the governor for varying the governed speed of said spindle.

2. In a grinding machine of the type described, the combination of a support, an electric motor carried by said support and having a shaft and a housing with spaced annular grooves, a pair of metal bands surrounding said housing and mounted for turning in said grooves and provided with bosses, a grinder quill mounted in said bosses and having a wheel spindle, a driving connection between said motor shaft and wheel spindle, and pivoted cam lever locking means for clamping said bands to said motor housing to secure said quill in the desired circumferential position relative to said housing.

3. In a grinding machine of the type described, the combination of a support, an electric motor carried by said support and having a shaft and a housing with spaced annular grooves, a pair of metal bands surrounding said housing and mounted for turning in said grooves and provided with bosses, a grinder quill mounted in said bosses and having a wheel spindle, a driving connection between said motor shaft and wheel spindle, a pivoted cam lever mounted on each band and engageable with said housing to clamp the band to said housing to secure said quill in the desired circumferential position relative to said housing.

4. In a grinding machine of the type described, the combination of a support, an electric motor carried by said support and having a shaft, a grinder quill having a wheel spindle eccentrically mounted therein, supporting means for said quill, a driving connection between said motor shaft and said wheel spindle effective on the adjustment of said quill in said supporting means, and pivoted cam lever locking means on the supporting means for the quill for fixing said quill against movement to maintain the adjustment of said driving connection.

5. A grinding unit consisting of a base support, an electric motor of the series type carried by said support and having an armature shaft extended to form a drive shaft, a quill carried by said support and having a spindle parallel to said armature shaft, a grinding wheel on one end of said spindle, a friction wheel on the other end of said spindle, a friction wheel on said drive shaft in direct friction pressure drive connection with the friction wheel on said spindle to drive said spindle, means for moving said spindle relative to said armature shaft to effect said drive connection, means for maintaining said connection, and a variable motor speed governor on said motor, said governor including a switch in the motor circuit responsive to the speed of said motor to maintain its speed substantially constant under varying demands placed upon it by the grinding wheel, and manually settable means for the governor for varying the governed speed of said motor to vary the speed of said spindle for varying diameters of grinding wheels.

6. A grinding unit consisting of a base support, an electric motor of the series type carried by said support and having an armature shaft extended to form a drive shaft, a quill carried by said support and having a spindle parallel to said armature shaft, a grinding wheel on one end of said spindle, a friction wheel on the other end of said spindle, a friction wheel on said drive shaft in direct friction pressure drive connection with the friction wheel on said spindle to drive said spindle at a speed greater than that of said drive shaft, means for moving said spindle relative to said armature shaft to effect said drive connection, means for maintaining said connection, and a variable motor speed governor on said motor, said governor including a switch in the motor circuit responsive to the speed of said motor to maintain its speed substantially constant under varying demands placed upon it by the grinding wheel, and manually settable means for the governor for varying the governed speed of said motor to vary the speed of said spindle for varying diameters of grinding wheels.

LOUIS O. FRENCH.

REFERENCES CITED

The following references are of record in the file of this patent:

UNITED STATES PATENTS

| Number | Name | Date |
| --- | --- | --- |
| 939,038 | Larson | Nov. 2, 1909 |
| 1,537,009 | Hagman | May 5, 1925 |
| 1,756,949 | McGonegal | May 6, 1930 |
| 2,020,977 | Warner | Nov. 12, 1935 |
| 2,092,714 | Flygare | Sept. 7, 1937 |

FOREIGN PATENTS

| Number | Country | Date |
| --- | --- | --- |
| 118,840 | Australia | Aug. 17, 1944 |
| 1,179,733 | Australia | June 14, 1934 |
| 517,291 | Great Britain | Jan. 25, 1940 |